United States Patent [19]

Clerc

[11] Patent Number: 4,693,338
[45] Date of Patent: Sep. 15, 1987

[54] EXHAUST MUFFLER FOR A MOTOR VEHICLE OR THE LIKE

[75] Inventor: Michel Clerc, Valentigney, France

[73] Assignee: Cycles Peugeot, Valentigney, France

[21] Appl. No.: 885,636

[22] Filed: Jul. 15, 1986

[30] Foreign Application Priority Data

Jul. 16, 1985 [FR] France ................................ 85 10900

[51] Int. Cl.[1] ........................... F01N 1/24; F01N 3/02
[52] U.S. Cl. .................................... 181/231; 181/252; 181/255; 181/256
[58] Field of Search ............... 181/231, 244, 252, 255, 181/256, 257

[56] References Cited

U.S. PATENT DOCUMENTS

| | | | |
|---|---|---|---|
| 3,163,256 | 12/1964 | Lanning | 181/244 |
| 3,898,063 | 8/1975 | Gazan | 181/231 X |
| 4,101,280 | 7/1978 | Frietzache et al. | 422/180 |
| 4,263,982 | 4/1981 | Feuling | 181/256 |
| 4,458,779 | 7/1984 | Johansson et al. | 181/252 |

FOREIGN PATENT DOCUMENTS

| | | |
|---|---|---|
| 2222663 | 12/1973 | Fed. Rep. of Germany . |
| 2248442 | 4/1974 | Fed. Rep. of Germany . |
| 2259817 | 6/1974 | Fed. Rep. of Germany . |
| 2225620 | 11/1974 | Fed. Rep. of Germany . |
| 2434102 | 2/1976 | Fed. Rep. of Germany . |
| 2454517 | 11/1980 | France . |
| 2467975 | 4/1981 | France . |

Primary Examiner—Benjamin R. Fuller
Attorney, Agent, or Firm—Sughrue, Mion, Zinn, Macpeak & Seas

[57] ABSTRACT

The exhaust muffler comprises a body (12) of ceramic material which is enclosed within a metal case (1) defining an inlet chamber (16) and an outlet chamber (18) for the exhaust gases. A blanket (20, 22) of refractory fibres resisting high temperatures, assembled with a very small amount of binder and substantially without water of constitution, is highly compressed between the body (12) and the case. A sealing element (24) surrounding the body (12) is interposed between the blanket and the gas outlet chamber (18).

11 Claims, 3 Drawing Figures

EXHAUST MUFFLER FOR A MOTOR VEHICLE OR THE LIKE

The present invention relates to catalytic exhaust mufflers which comprise, inside a metal case defining gas inlet and outlet chambers, a body of a ceramic material, of the honeycomb or like type, which treats the gases and which must consequently be passed through by the whole of the latter. Now, it is well known that the ceramic material is extremely fragile and it is therefore necessary to protect it against risks of deterioration due to vibrations undergone by the exhaust muffler or to the differential expansion between the ceramic and its case.

For this purpose, the body of ceramic is usually maintained inside the case by a metal netting or trellis which provides its suspension.

Unfortunately, this metal trellis does not resist high temperatures which may reach 800° to 1,000° C. to which the exhaust gases are brought. A sealing element is therefore necessary for isolating the metal trellis from the gas inlet chamber. However, it is found that this sealing element has a tendency to deteriorate, which results in the deterioration of the trellis, so that not only the body of ceramic material is no longer held in position, a part of the exhaust gases may flow around the body of ceramic material in the space therebetween and the case, so that it is not treated.

An object of the present invention is to overcome this drawback by providing a catalytic exhaust muffler which affords great safety in operation and in particular in the maintenance of the position of the body of ceramic material.

The invention therefore provides a catalytic exhaust muffler comprising at least one body of ceramic material, of the honeycomb or like type, enclosed within a metal case and defining with the metal case gas inlet and outlet chambers, there being provided, between each body of ceramic material and the case, a blanket of fibres having high resistance to high temperatures, said blanket being substantially devoid of binder and devoid of water of constitution and being highly compressed, and a sealing element surrounding the end of the body of ceramic material which is adjacentto the outlet chamber.

The constitution of the blankets of fibres and its compression enable it not only to absorb differential expansions and/or vibrations but also to form a barrier against the passage of the gases between the body of ceramic material and the case, which ensures high efficiency of the exhaust muffler, even at very high temperatures.

According to a feature of the invention, the blanket of fibres surrounds the whole of the body of ceramic material.

The sealing element may be formed by a closely braided cord of fibres very resistant to high temperatures, similar to those which constitute the blanket, or by a thermoexpansible material.

According to another embodiment, the blanket is made in two parts, each of which has a length close to that of one of the large-diameter portions of the body of ceramic material, and are spaced from each other.

The following description of embodiments given by way of non-limiting examples and shown in the accompanying drawings will bring out the features and advantages of the invention. In, the drawings.

Figure 1:
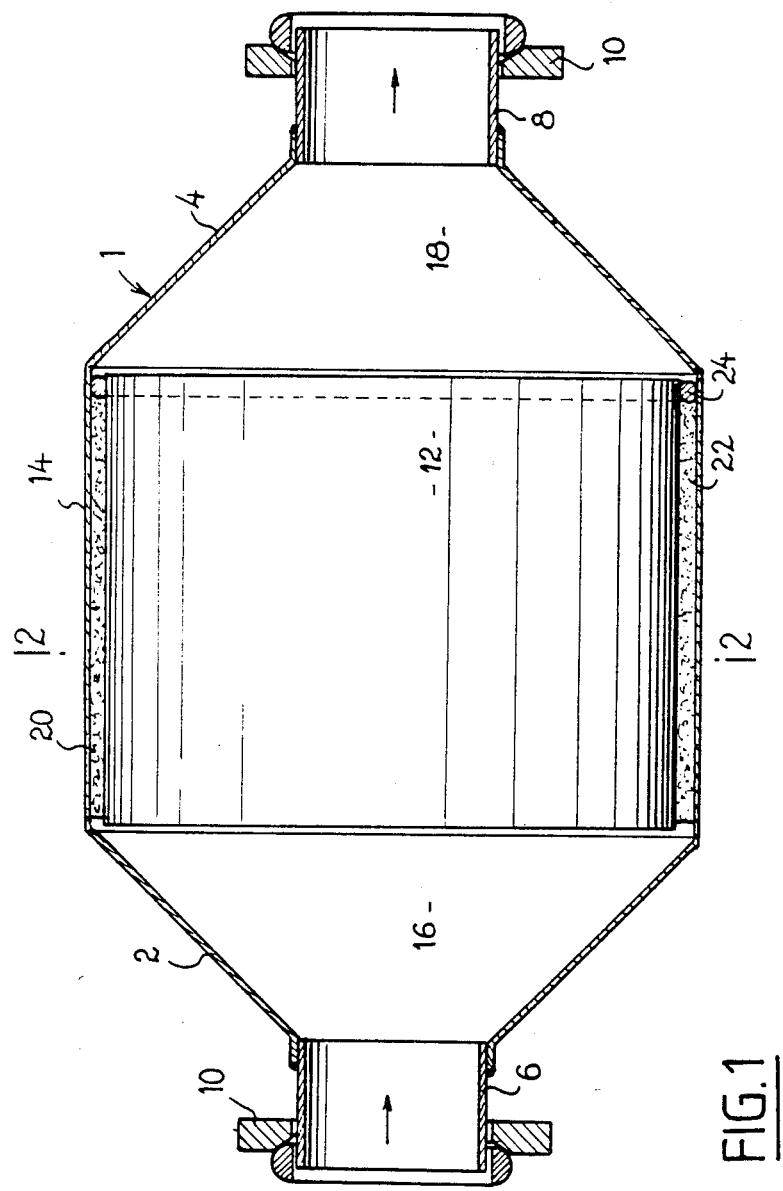
FIG. 1 is a diagrammatic axial sectional view of an exhaust muffler according to the invention.

The catalytic exhaust muffler illustrated in the drawings comprises in the conventional manner a case 1 having a substantially elliptical cross-sectional shape and comprising two half-shells 1a and 1b interconnected by flanges 3a and 3b whose assembled two end portions 2 and 4 have progressively decreasing diameters for the purpose of being secured to exhaust gas inlet and outlet pipes 6 and 8 respectively. Each of the pipes 6 and 8 preferably carries a fixing flange 10 for securing exhaust piping.

Mounted inside the case 1 is a body 12 which has an elliptical cross-sectional shape similar to that of the central portion 14 of the case 1 but with slightly smaller diameters so as to define an annular space therebetween and the case 1. This body 12 thus defines with the narrowed portions 2 and 4 of the case 1 an inlet chamber 16 and an outlet chamber 18 for the exhaust gases. It also puts these chambers 16 and 18 in communication with each other, since it includes multiple internal passageways, for example in the form of a honeycomb structure.

Interposed between the body 12 of ceramic material and the case 14 is a blanket of fibres which is highly compressed and ensures the suspension of the body 12. The blanket 20, 22 is formed by so-called long fibres having for example diameters of 2 to 10μ and a high resistance to high temperatures and to most of the corrosive agents in an oxidizing or reducing atmosphere. Further, the blanket of fibres contains only a very small quantity of binder, preferably less than 2%, and substantially no water of constitution. Particularly suitable blankets are for example those made from compound fibres based on magnesia and/or lime and/or alumina and/or silica and in particular the ceramic fibre sold by the firm Carborandum under the name "Fibermax Buck Fiber".

The blanket is moreover highly compressed under a pressure on the order of 2 metric tons which reduces its thickness to ¼ or 1/5th of its initial value.

Figure 2:
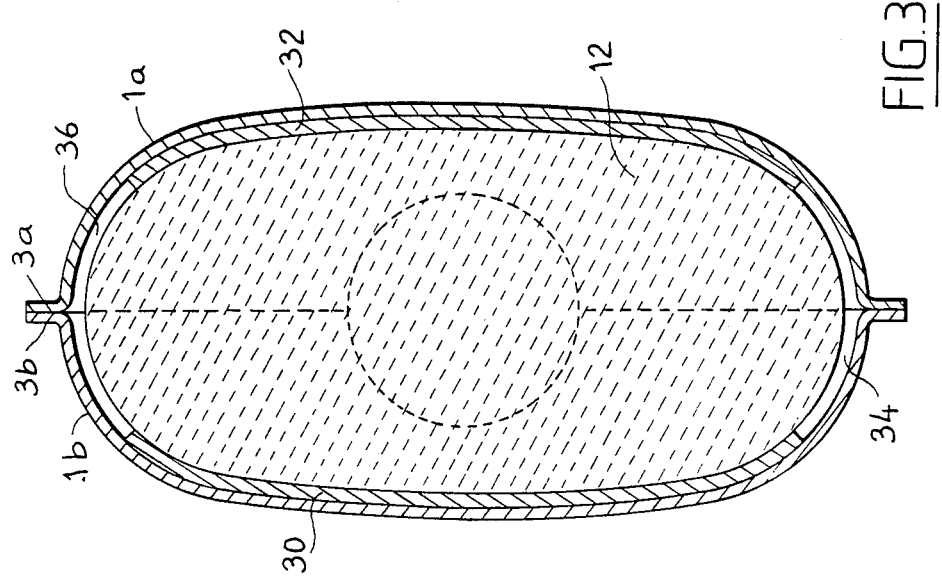
FIG. 2 is a sectional view taken on line 2—2 of FIG. 1.

In the embodiment shown in FIG. 2, the blanket is made in two juxtaposed parts, each of which covers one half of the outer surface of the body 12 of ceramic material, and which are clamped against each other in the case 1.

A sealing element 24 is moreover mounted around the body 12 in the vicinity of the exhaust gas outlet chamber 18 which it separates from the blanket 20, 22. This sealing element may be made from any suitable material, but is preferably formed by a cord of closely braided fibres constituted by fibres similar to those constituting the blanket, i.e. fibres having a very good resistance to high temperatures and also having a high resistance to corrosive agents, or from a band of thermoexpansible material such as thermoexpansible paper sold by the firm Carborandum under the name "Fiberfrax XPE-3100 Paper". This band is simply wound around the body 12, the ends being cut into tenons and mortises for affording the seal.

Figure 3:
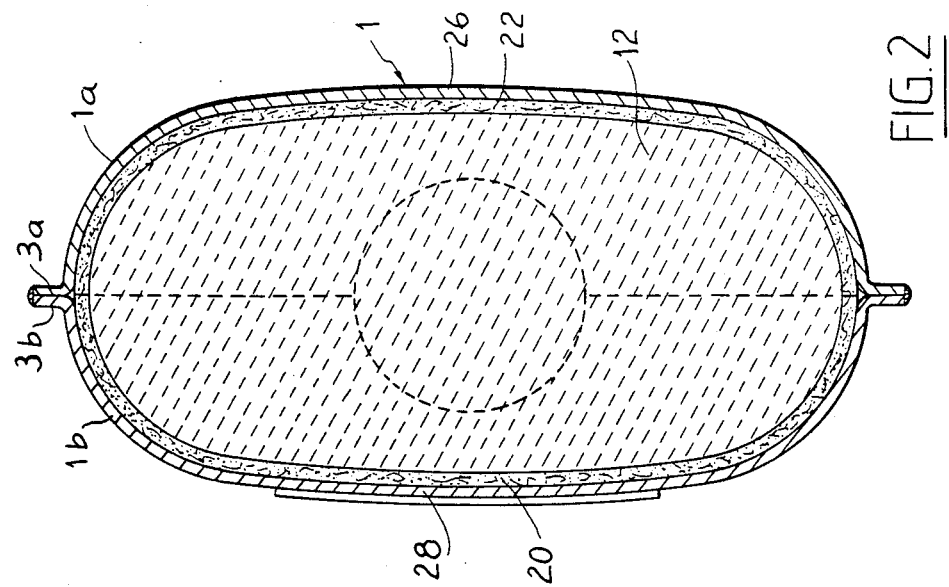
FIG. 3 is a view similar to FIG. 2 of a variant.

According to the variant shown in FIG. 3, the blanket is made in two parts 30 and 32 which are spaced apart and cover only a part of the ceramic body 12, each of the parts 30, 32 of the blanket however extending over a length sufficient to cover at least the major part of the surface of large diameter of the body 12. In the embodiment shown in FIG. 3, each part of the blanket in fact extends over the whole of the surface of large diameter of the body 12 and is even extended in a portion of the surface of small diameter. A space 34, 36 is thus provided at two opposed points of the cross-section of the exhaust muffler between the two blankets 30 and 32.

In this embodiment, as in the preceding embodiment, the blankets 30 and 32 are highly compressed and this compression combined with the nature of the fibres from which the blankets are made enable them not only to resist high temperatures, such as those of exhaust gases entering the inlet chamber 16, but also to perform the function of a sealing element preventing the passage of these hot gases around the ceramic body 12. It will be understood that the spaces 34 and 36 allow a stream of gas through but this stream is stopped in an extremely reliable manner by the sealing element 24 which prevents their entry into the outlet chamber 18 and obliges them to pass through the body 12.

The blankets 20 and 22 ensure an almost total seal. In any case, the gases which reach the sealing element 24 have been considerably cooled and are at a temperature which is distinctly lower than that of the inlet chamber 16. Risks of deterioration of the sealing element are therefore extremely reduced.

The exhaust muffler therefore has an excellent resistance to temperature and this enables it to be used for a long time with high efficiency.

It is moreover extremely simple to assemble. Indeed, the blankets 20, 22 or 30, 32, whose initial thickness is on the order of 20 mm, are first of all placed on the outer surface of the ceramic body 12 by leaving at the end of the latter place for the sealing element 24. This sealing element is then placed in position around the body 12 and then the assembly is inserted in one of the semi-shells 26 adapted to form the case 1. The second semi-shell 28 is then applied with a pressure of a few metric tons, on the blanket remote from the semi-shell 26 and compressed until it comes into contact with this semi-shell, the blankets 20, 22 or 30, 32 then having a thickness on the order of 4 to 5 mm. At this moment, the semi-shells 26 and 28 are welded together and the exhaust muffler constitutes a coherent unit ready to be placed in position.

Although the embodiment just described concerns an exhaust muffler comprising only a single body 12 of ceramic, it will be clear that an exhaust muffler according to the invention may have a plurality of similar bodies mounted in the same case in such manner as to be passed through in succession by the exhaust gases and each maintained in position by a compressed blanket of fibres in one or more parts, and a sealing element 24 at their end which is the closest to the gas outlet chamber.

What is claimed is:

1. A catalytic exhaust muffler comprising at least one body of ceramic material, of the honeycomb type, a metal case coaxially enclosing the body and defining with the body an annular space around the body and inlet and outlet chambers at axially opposite ends of the body a blanket of fibres interposed between the body and the case in said annular space, the fibres of the blanket being very resistant to high temperatures, said blanket being substantially devoid of binder and devoid of water of constitution and being highly compressed between the body and the case, said case comprising two half shells which have an arcuate cross-sectional shape and means interconnecting said half-shells, each half-shell having axially opposite end portions extending toward the axis of the body inwardly beyond an outer periphery of the body, and a sealing element surrounding an end of the body of ceramic material which is the closest to the outlet chamber and is compressed between said case and said body.

2. An exhaust muffler according to claim 1, wherein the blanket is constituted by long fibres such as compound fibres based on a material selected from the group comprising magnesia, lime, silica, alumina and combinations thereof.

3. An exhaust muffler according to claim 1, wherein the blanket surrounds the whole of an outer surface of the body of ceramic material.

4. An exhaust muffler according to claim 1, wherein the body has an outer surface comprising two surface portions substantially of large radius and two surface portions substantially of smaller radius interconnecting the surface portions of larger radius, and the blanket comprises two parts, each part covering at least the major part of a respective one of the surface portions of large diameter of the body.

5. An exhaust muffler according to claim 4, wherein each blanket part extends along one of the surface portions of large diameter of the body and extends only along a portion of the surface portion of smaller radius, a space being left free between the two blanket parts.

6. An exhaust muffler according to claim 1, wherein the sealing element is constituted by a cord of fibres having a high resistance to temperatures, said cord being tightly braided.

7. An exhaust muffler according to claim 1, wherein the sealing element is a band of thermoexpansible material.

8. An exhaust muffler according to claim 1, wherein the blanket has a thickness on the order of between one fifth and one quarter of an initial thickness of the blanket before compression thereof between the body and the case.

9. An exhaust muffler according to claim 1, wherein the blanket is constituted by fibres resisting a temperature higher than 1000° C. and corrosive agents in an oxidizing atmosphere.

10. An exhaust muffler according to claim 1, wherein the blanket is constituted by fibres resisting a temperature higher than 1000° C. and corrosive agents in a reducing atmosphere.

11. A catalytic exhaust muffler comprising at least one body of ceramic material, of the honeycomb type, a metal case coaxially enclosing the body and defining with the body an annular space around the body and inlet and outlet chambers at axially opposite ends of the body, a blanket of fibres interposed between the body and the case in said annular space, the fibers of the blanket being very resistant to high temperatures, said blanket being substantially devoid of binder and devoid of water of constitution and being highly compressed between the body and the case, said case comprising two half-shells which have a substantially semi-eliptical cross-sectional shape and means interconnecting said half-shells, each half-shell having axially opposite end portions extending toward the axis of the body inwardly beyond the outer periphery of the body and defining with the other half-shell respectively an inlet and an outlet to which an inlet pipe and an outlet pipe are respectively secured, the inlet chamber communicating directly with a respective end of the blanket through said annular space between the case and the body, and a sealing element surrounding an end of the body of ceramic material which is the closest to the outlet chamber and interposed between said case and said body in said annular space, said compression of the blanket being such as to have reduced its thickness by a major part of its initial thickness.

* * * * *